March 29, 1927.

B. M. SALMON

FRYING PAN COVER

Filed Nov. 30, 1926

1,622,351

INVENTOR.
B. M. Salmon,
BY
ATTORNEY.

Patented Mar. 29, 1927.

1,622,351

UNITED STATES PATENT OFFICE.

BARBARA M. SALMON, OF SEVERNA PARK, MARYLAND.

FRYING-PAN COVER.

Application filed November 30, 1926. Serial No. 151,779.

The invention relates to a cover for a skillet or frying pan.

The object of the present invention is to provide a simple, practical and inexpensive skillet or frying pan cover of strong, durable construction, designed to be used when frying any kind of food and adapted to keep the grease from spattering on the stove or on the person using the frying pan or skillet, and at the same time insure better fried food.

A further object of the invention is to provide a cover for cooking utensils of this character equipped with absorbent material for absorbing the flying grease and provided also with perforations adapted to permit the escape of steam to prevent the food from stewing instead of frying.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
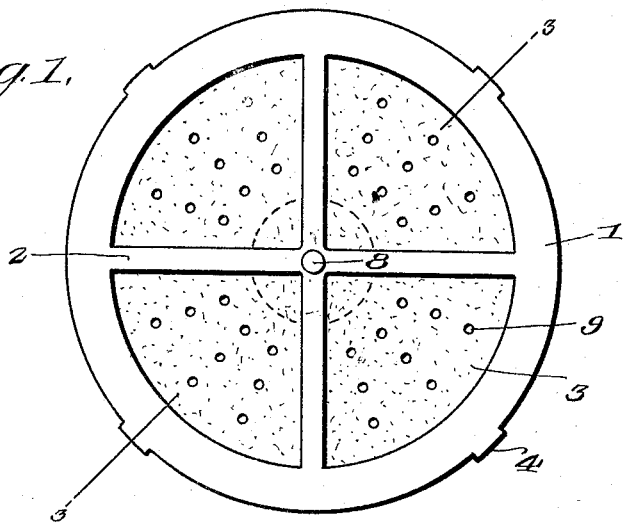
Figure 1 is a plan view of a skillet or frying pan cover constructed in accordance with this invention.
Figure 2:
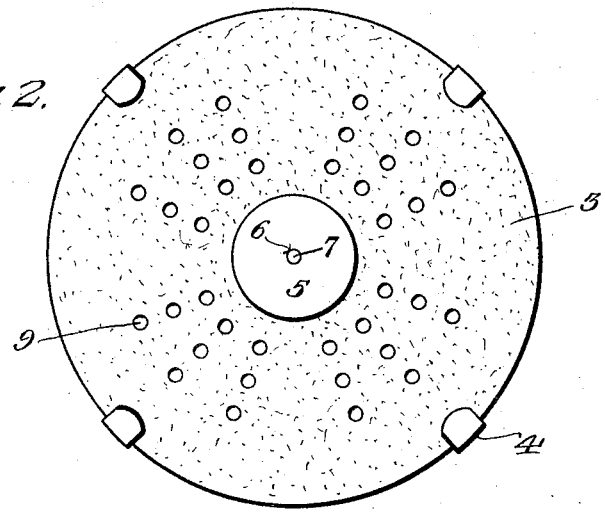
Fig. 2 is a reverse plan view of the same.
Figure 3:
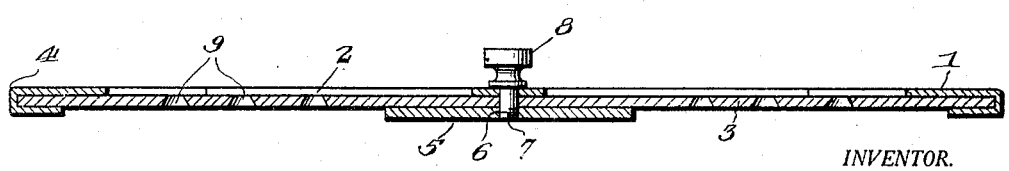
Fig. 3 is a transverse sectional view taken substantially on the line 3—3 of Fig. 1.

In the accompanying drawing, in which is illustrated the preferred embodiment of the invention, the lid or cover for skillets or frying pans comprises in its construction a skeleton frame 1 constituting the body portion of the cover and consisting of a marginal ring and diametrically arranged cross bars 2 radiating from the center of the frame or body and formed integral at the point of crossing. The circular frame of the lid is preferably constructed of a single piece of flat sheet metal or analogous material.

The body portion or frame 1 is provided in its lower face with a disc 3 of absorbent material such as blotting paper for absorbing flying grease and preventing the same from spattering on the stove or on the person using the skillet or frying pan. The absorbent disc 3 is held in place by marginal lugs 4 arranged at the periphery of the frame which bend inwardly beneath the same to engage the peripheral edge of the absorbent disc 3 at spaced points. The absorbent disc is also secured to the frame 1 at the center thereof by a metallic washer or member 5 having a threaded opening 6 for the reception of the stem 7 of a knob 8. The knob is arranged on the upper face of the frame at the center thereof and the stem pierces the crossed bars 2 at the integral central portion thereof and engages the threaded opening of the metal washer or clamping member 5. The absorbent disc is firmly retained in position by the peripheral and central holding means and it may be readily removed and replaced by a new piece of blotting paper or other absorbent material when required.

In order to prevent the steam resulting from the frying from collecting within the skillet or frying pan and producing a stewing of the food, the absorbent disc is provided with conical perforations 9 which are tapered upwardly and which permit the escape of the steam while preventing the grease from splashing through the perforated disc. The skillet or frying pan cover not only protects the stove and the person using the cooking utensil, but it also insures a better food and produces more sanitary cooking in that it excludes foreign matter from the cooking utensil during the frying operation where the food is usually exposed.

I claim:

1. A cover for frying utensils provided with an absorbent element arranged to have its under side disposed to absorb and thereby prevent grease from spattering on the stove or on the person using the cooking utensil.

2. A cover for frying utensils provided with an absorbent element arranged to have its under side disposed to absorb and thereby prevent grease from spattering on the stove or on the person using the cooking utensil, said element being provided with apertures for the escape of steam to prevent stewing of covered food.

3. A cover for frying utensils provided with an absorbent element arranged to have its under side disposed to absorb and thereby prevent grease from spattering on the stove or on the person using the cooking utensil, said element being provided with conical apertures tapered upwardly and adapted to permit the escape of steam and prevent stewing of foods instead of frying.

4. A cover for frying utensils comprising a skeleton frame and an absorbent member carried by the skeleton frame and arranged to have its under side disposed to absorb and thereby prevent grease from spattering on a stove or person using the utensil and having means for the escape of steam to prevent stewing of the contents of the utensil.

5. A cover for frying utensils comprising a skeleton frame consisting of a rim and cross bars, an absorbent disc secured to the frame and having its under side disposed to absorb and thereby prevent grease from spattering out of the utensil and provided with perforations for the escape of steam, the absorbent being adapted to absorb and thereby prevent spattering of the contents from the latter.

6. A cover for frying utensils comprising a skeleton frame consisting of a rim and cross bars, and an absorbent disc secured to the lower face of the skeleton frame and having means for the escape of steam.

7. A cover for frying utensils comprising a skeleton frame consisting of a rim and cross bars, an absorbent disc arranged on the lower face of the frame, and lugs carried by the frame at the periphery thereof and engaging the absorbent disc at spaced points for holding the disc in place.

8. A cover for frying utensils comprising a skeleton frame consisting of a rim and cross bars, an absorbent disc fitted against the lower face of the frame and adapted to prevent grease from spattering from the utensil, a central clamping member fitted against the disc, and a knob having a shank piercing the frame and the absorbent disc and secured to the clamping member for retaining the disc in place.

9. A cover for frying utensils comprising a skeleton frame consisting of a rim and cross bars, an absorbent disc arranged on the lower face of the frame, lugs carried by the frame at the periphery thereof and engaging the absorbent disc at spaced points for holding the disc in place, a central clamping member fitted against the lower face of the disc, and a knob having a stem passing through the frame and the absorbent disc and secured to the clamping member.

In testimony whereof I have hereunto set my hand.

BARBARA M. SALMON.